(12) United States Patent  
Kwon

(10) Patent No.: US 9,335,007 B2  
(45) Date of Patent: May 10, 2016

(54) LIGHT-EMITTING DIODE LAMP ASSEMBLY

(71) Applicant: Younghwan Jang, Seoul (KR)

(72) Inventor: Mi Suk Kwon, Seoul (KR)

(73) Assignee: Younghwan Jang, Seoul (KR)

( * ) Notice: Subject to any disclaimer, the term of this patent is extended or adjusted under 35 U.S.C. 154(b) by 2 days.

(21) Appl. No.: 14/375,626

(22) PCT Filed: Jan. 23, 2013

(86) PCT No.: PCT/KR2013/000519  
§ 371 (c)(1),  
(2) Date: Jul. 30, 2014

(87) PCT Pub. No.: WO2013/122335  
PCT Pub. Date: Aug. 22, 2013

(65) Prior Publication Data  
US 2014/0369056 A1 Dec. 18, 2014

(30) Foreign Application Priority Data  
Feb. 16, 2012 (KR) .......................... 10-2012-0015814

(51) Int. Cl.  
*F21K 99/00* (2016.01)  
*B60K 37/04* (2006.01)  
(Continued)

(52) U.S. Cl.  
CPC ............... *F21K 9/1355* (2013.01); *B60K 37/04* (2013.01); *F21K 9/00* (2013.01); *F21V 17/06* (2013.01); *B60K 2350/302* (2013.01);  
(Continued)

(58) Field of Classification Search  
CPC ......... F21K 9/1355; F21K 9/00; F21V 17/06; B60K 37/04; B60K 2350/941; B60K 2350/302; F21W 2131/403; F21W 211/00; F21Y 2101/02

USPC ............... 362/311.02, 249.02, 640, 652, 653, 362/654, 657, 658, 659, 647, 646  
See application file for complete search history.

(56) References Cited

U.S. PATENT DOCUMENTS 7,628,513 B2 * 12/2009 Chiu ........................ F21K 9/137  
362/240  
8,157,422 B2 * 4/2012 Paik ........................ F21K 9/137  
362/249.02

(Continued)

FOREIGN PATENT DOCUMENTS

| JP | 11-176226 A | 7/1999 |
| JP | 2000-353422 A | 12/2000 |
| KR | 10-0708348 B1 | 4/2007 |
| KR | 10-0936371 B1 | 1/2010 |

*Primary Examiner* — Laura Tso  
(74) *Attorney, Agent, or Firm* — Im IP Law PLLC; C. Andrew Im

(57) ABSTRACT

A light-emitting diode lamp assembly comprises a housing unit formed in a Y shape, a contact terminal for supplying electrical power and configured to be inserted into the housing unit, and a substrate configured to be mounted on the upper side of the housing unit and for receiving power from the contact terminal. The light-emitting diode lamp assembly further comprises a cover unit which is positioned on the upper part of the substrate and which can effectively release light released from an LED mounted on the substrate. The light-emitting diode lamp assembly is configured to be mounted on the inner side of a dashboard of various mechanical equipment, and is used to increase the discrimination between components on the dashboard and to improve profitability by simplifying the shape of the components and facilitating the assembly of the components.

7 Claims, 7 Drawing Sheets

(51) Int. Cl.
*F21V 17/06* (2006.01)
*F21Y 101/02* (2006.01)
*F21W 111/00* (2006.01)
*F21W 131/403* (2006.01)

(52) U.S. Cl.
CPC ..... *B60K 2350/941* (2013.01); *F21W 2111/00* (2013.01); *F21W 2131/403* (2013.01); *F21Y 2101/02* (2013.01)

(56) References Cited

U.S. PATENT DOCUMENTS

2012/0001531 A1* 1/2012 Cho .................. F21K 9/137
 313/46
2012/0268937 A1* 10/2012 Lee .................. F21V 29/004
 362/249.02
2013/0100674 A1* 4/2013 Kim .................. F21V 21/00
 362/249.14

* cited by examiner

LIGHT-EMITTING DIODE LAMP ASSEMBLY

RELATED APPLICATION

This application is a §371 application from PCT/KR2013/000519 filed Jan. 23, 2013, which claims priority from Korean Patent Application No. 10-2012-0015814 filed Feb. 16, 2012, each of which is herein incorporated by reference in its entirety.

TECHNICAL FIELD

The present invention relates to a light emitting diode lamp assembly mounted on a dashboard of a mechanical tool, a vehicle or the like, including various kinds of electronic products, to enhance recognizability of the dashboard.

BACKGROUND ART

A filament lamp is generally used as a lamp for a dashboard or a license plate of a mechanical tool, a vehicle or the like including various kinds of electronic products. The filament lamp is inserted on the top of a socket and illuminates a room as the filament emits light when electrical power is applied through the socket, which facilitates indoor activities at night or in a dark place.

However, since the general filament lamp described above frequently experiences open circuit of the filament by a physical or electrical impact, the lifespan of the filament lamp is short. This creates a troublesome problem of having to replace the lamp frequently and incurring economic loss due to such frequent replacement, thereby burdening the user.

Therefore, various attempts have been made devising a lamp using an LED in order to overcome the disadvantages associated with the conventional lamp described above.

Generally, a light emitting diode (LED) is a lighting equipment which emits light by forward current. Since it is very robust to an impact, has a semi-permanent lifespan and is comparatively cheap. The light emitting diode is widely used in various fields and is commonly used in any place in which illumination is needed such as a dashboard of a vehicle, an audio system, an air conditioner and the like. In addition, since the light emitting diode needs to be supplied with power to operate and compositely configured together with other circuit elements, it is mounted on a printed circuit board and a mounting structure is required.

LED is a structure in which two through-holes spaced apart from each other are formed on a printed circuit board to communicate the top and bottom surfaces. Two legs of the light emitting diode are inserted into the through-holes and welded to a copper film on the printed circuit board by means of soldering. If the legs of the light emitting diode are inserted into the through-holes formed on the printed circuit board from a side opposite to the surface of the printed circuit board on which the copper film is formed, then the copper film and the end points of the legs of the light emitting diode are welded by soldering at the side on which the copper film of the printed circuit board is formed. The light emitting diode is fixed to the printed circuit board and mounting of the light emitting diode is completed.

However, if the light emitting diode is mounted on the printed circuit board in such conventional structure, the legs of the light emitting diode should be welded and fixed to the copper film through soldering. This leads to a problem in that productivity is lowered because the work time is extended due to degradation in workability. Furthermore, once the light emitting diode is mounted on the printed circuit board, it is difficult to separate and replace a damaged light emitting diode lamp.

It is known that Korean Utility Model Registration No. 20-261626 entitled "Structure of mounting a substrate of a light emitting diode for illumination" has been proposed to solve the above problems to certain extent.

A pair of connectors are inserted into mounting grooves of a socket to be spaced apart from each other. A light emitting diode is coupled to the connectors by inserting the legs (lead frames) of the light emitting diode into the connectors to contact the inner surfaces of the connectors. However, since a pair of connectors are simply inserted and loaded in a space unit formed inside the socket, the loaded state of the connectors can be released due to external vibrations or the like to make the connectors loose or dislodge the light emitting diode. If the lead frames of the light emitting diode coupled to the inner surfaces of the connectors do not maintain a linear state and are bent, contact failure may occur between the light emitting diode and the connectors.

In addition, since a wire which supplies power to the lead frames of the light emitting diode directly contacts the connectors connected to a ground protrusion by welding, an external impact applied to the light emitting diode is directly transferred to the connectors. The welded state of the ground protrusion can be released or contact failure can occur from the external impact directly transferred to the connectors, thereby lowering the quality.

OBJECT AND SUMMARY OF THE INVENTION

Technical Problem

Therefore, the present invention has been made in view of the above problems. It is an object of the present invention to provide a further improved light emitting diode lamp assembly. In a light emitting diode lamp assembly, one or more light emitting diodes are mounted on a substrate on the top of a socket base. The lamp assembly is formed to directly conduct electricity to the substrate by inserting the end points of the contact terminal into the substrate. The lamp assembly is mounted inside the dashboard of a variety of mechanical apparatuses to enhance recognizability of the dashboard and improve profitability by simplifying the shape of components and facilitating assembly of the components.

Technical Solution

To accomplish the above object, the present invention includes an embodiment described below.

According to an aspect of the present invention, there is provided a light emitting diode lamp assembly including: a housing unit having a cross section formed in a Y shape; a contact terminal inserted inside the housing unit and conducting electricity; a substrate unit on a top of the housing unit and receiving power from the contact terminal; and a cover unit positioned on a top of the substrate unit and effectively radiating light emitted from an LED mounted on the substrate unit.

The housing unit includes a body unit and a substrate resting unit. The body unit has contact terminal guide grooves formed on front and rear surfaces. The substrate resting unit is on a top of the body unit and has a cross section formed in a 'ㄷ' shape. The substrate resting unit includes the grooves formed on a top surface of the substrate resting unit to be spaced apart from each other by a predetermined distance. A substrate resting surface is formed inside the grooves. A latch protrusion unit is formed at one side of the substrate resting surface and protrudes toward the outside to settle the contact terminal. A contact terminal guide through-hole allows the contact terminal to pass through to be inserted into a contact terminal guide hole of the body unit. A contact terminal fixing protrusion unit is formed between the latch protrusion unit and the contact terminal guide through-hole to fix the contact terminal. A plurality of air passage holes are formed on an inner bottom surface of the substrate resting unit to discharge heat to outside. A cover fixing unit is positioned on top of the substrate resting unit to fix the cover unit.

The substrate unit is on the substrate resting unit of the housing unit, in which one or more surface-mounting type light emitting diodes are mounted on a top surface of the substrate unit. The substrate unit includes a housing resting protrusion unit including contact terminal fixing holes spaced apart from each other by a predetermined distance inside the substrate. A cover fixing unit coupling hole is formed between the housing resting protrusion unit and another housing resting protrusion unit so that the cover fixing unit of the covering unit may be exposed to outside.

The substrate unit includes a first substrate formed in a horizontal direction, a second substrate formed under the first substrate, and a conductive unit for applying power supplied to the first substrate to the second substrate.

The conductive unit includes a connection pin inserted into the first substrate and the second substrate, and fixed by soldering. An insulator is positioned inside the connection pin and coated with an insulation material.

The contact terminal is inserted into the contact terminal guide groove through the contact terminal guide through-hole of the housing. The contact terminal includes a contact terminal body unit coupled to the latch protrusion unit. A contact terminal extended protrusion unit is formed in a "∟" shape by extending one end of the contact terminal body unit toward outside. The contact terminal extended protrusion unit includes the contact terminal latch through-hole to be engaged with and fixed to the contact terminal fixing protrusion unit. A contact terminal fixing unit is extended to the other end of the contact terminal extended protrusion unit. The contact terminal fixing unit is bent downward in a "⌐" shape and inserted into the contact terminal guide hole of the body unit.

The cover unit is on top of the housing unit and includes a plurality of grooves formed at a lower portion to expose the housing resting protrusion unit of the substrate unit. A coupling protrusion unit is formed inside the cover unit to be coupled to the cover fixing unit of the housing unit.

Advantageous Effects

The present invention may pursue following effects by the configuration described above.

In a light emitting diode lamp assembly according to the present invention, one or more light emitting diodes are coupled to and mounted on a substrate on top of a socket base. This enables the lamp assembly mounted inside the dashboard of a variety of mechanical apparatuses to enhance dashboard recognizability, and to improve profitability by simplifying the shape of components and facilitating assembly of the components.

In addition, since the light emitting diode lamp assembly according to the present invention is inserted into a general socket, the assembly of components can be easily accomplished. Since the lamp assembly may maintain a semi-permanent lifespan of use owing to the LED elements, it is very economical. In addition, an effect of expressing a distinguished indoor lighting color depending on the preference of a user or characteristics of a vehicle can be obtained owing to the characteristics of the LED elements having diverse light-ing emitting colors.

In addition, productivity and maintainability are improved by reducing work time when a work or a maintenance task is performed, and profitability is improved by simplifying the shape of components and facilitating assembly of the components.

DESCRIPTION OF SYMBOLS

Figure 1:
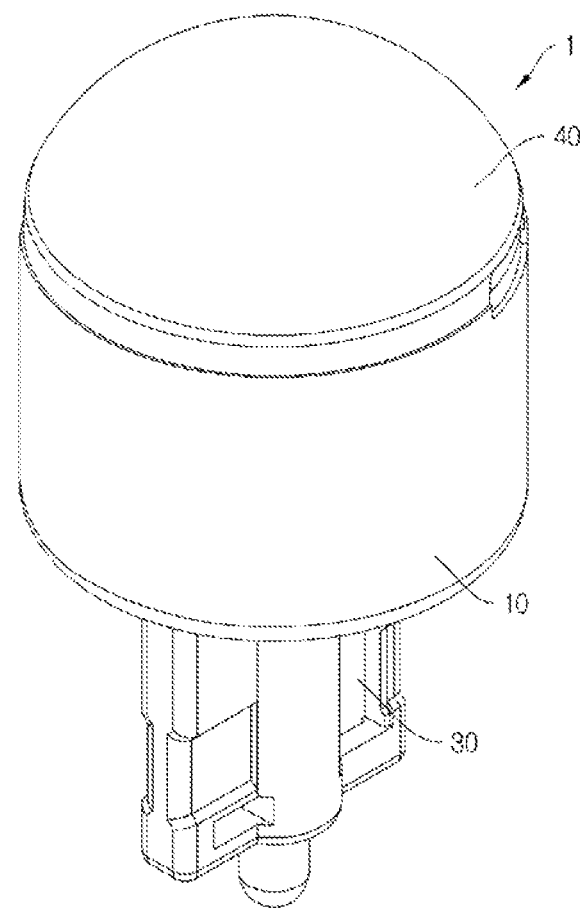
FIG. 1 is a perspective view showing a light emitting diode lamp assembly according to the present invention.

| 10 | Socket base | 20 | Substrate unit |
| 30 | Contact terminal | 40 | Cover unit |

DETAILED DESCRIPTION OF THE EMBODIMENTS

Hereinafter, a light emitting diode lamp assembly according to the present invention will be described in detail with reference to the accompanying drawings. In the drawings illustrating the embodiments of the present invention, elements having like functions will be denoted by like reference numerals and details thereon will not be repeated.

In addition, detailed descriptions of already known functions or specific descriptions of constitution related to the present invention will be omitted.

Figure 2:
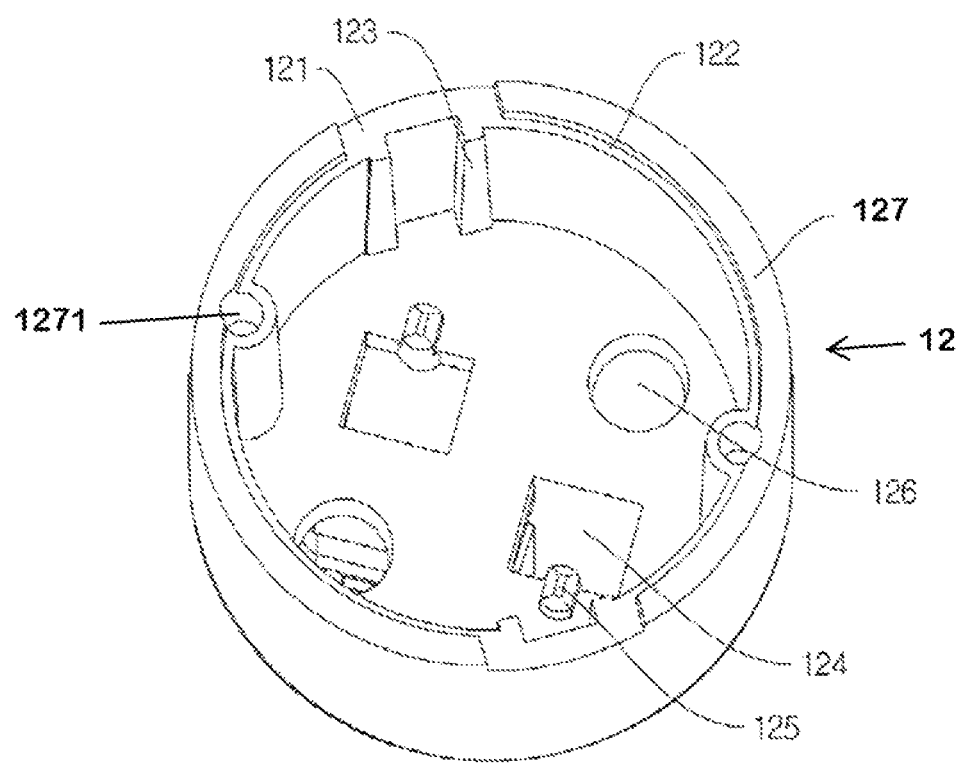
FIG. 2 is an exploded perspective view showing a light emitting diode lamp assembly according to the present invention.
Figure 3:
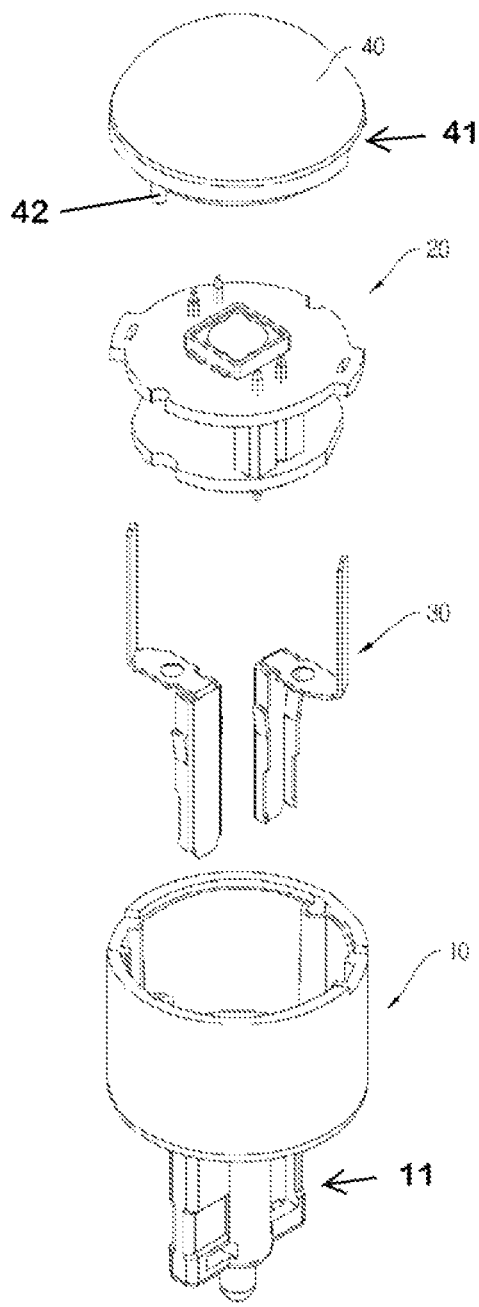
FIGS. 3 to 4 are perspective views showing a socket base of a light emitting diode lamp assembly according to the present invention.
Figure 4:
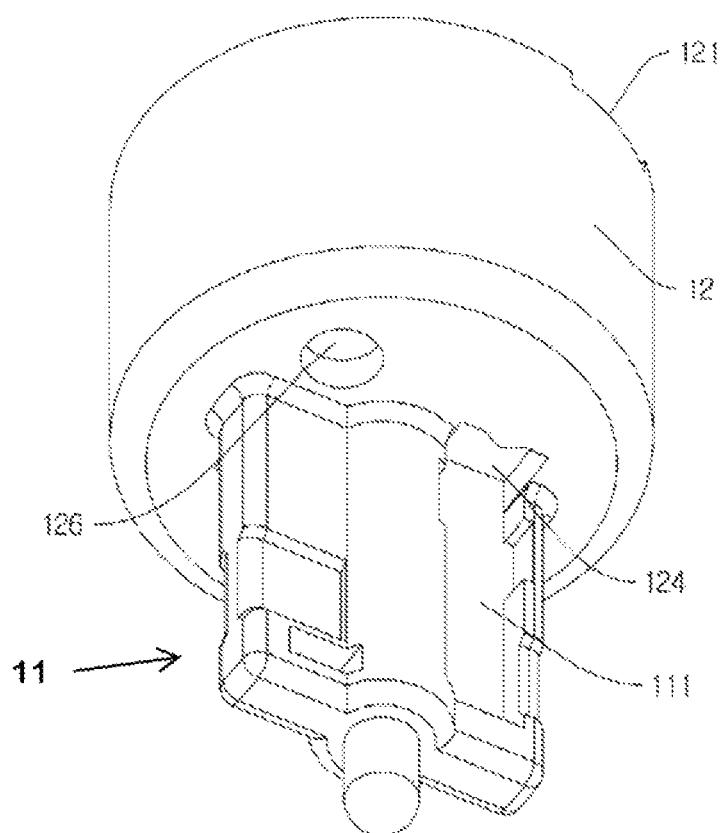
Figure 5A:
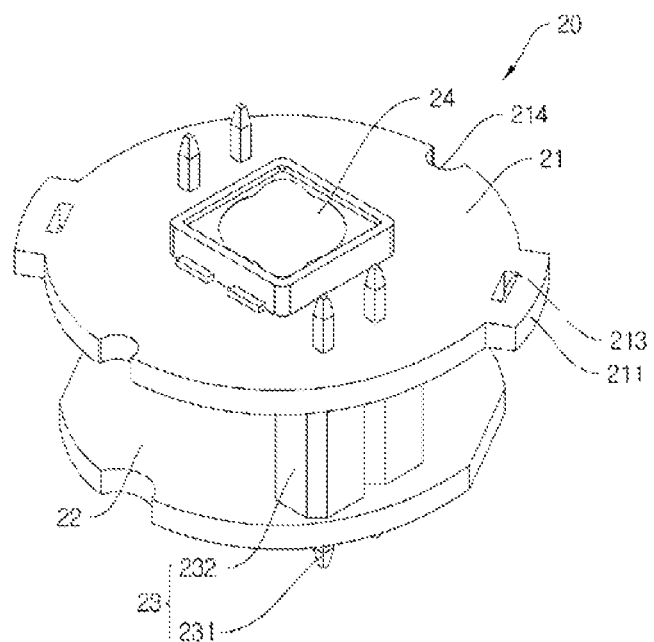
FIGS. 5A to 5B are perspective views showing a substrate unit of a light emitting diode lamp assembly according to the present invention.
Figure 5B:
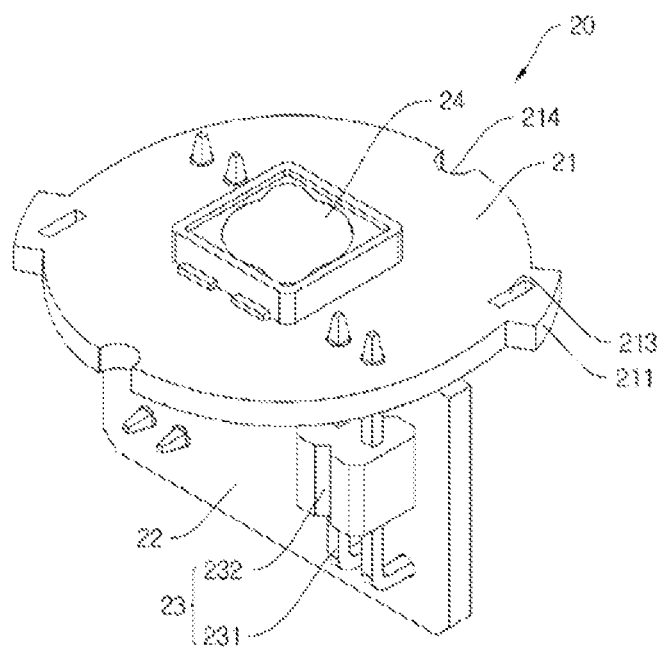
Figure 6:
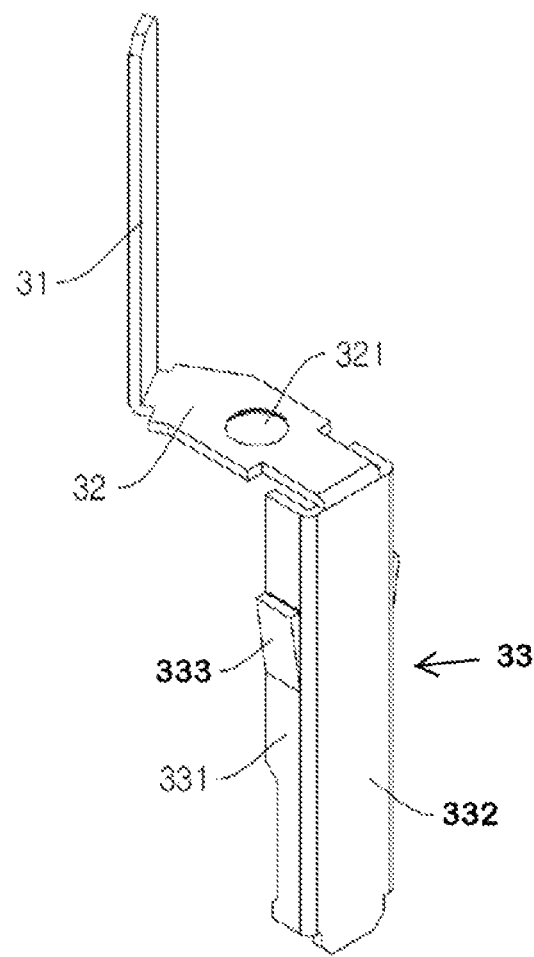
FIG. 6 is a perspective view showing a contact terminal of a light emitting diode lamp assembly according to the present invention.
Figure 7:
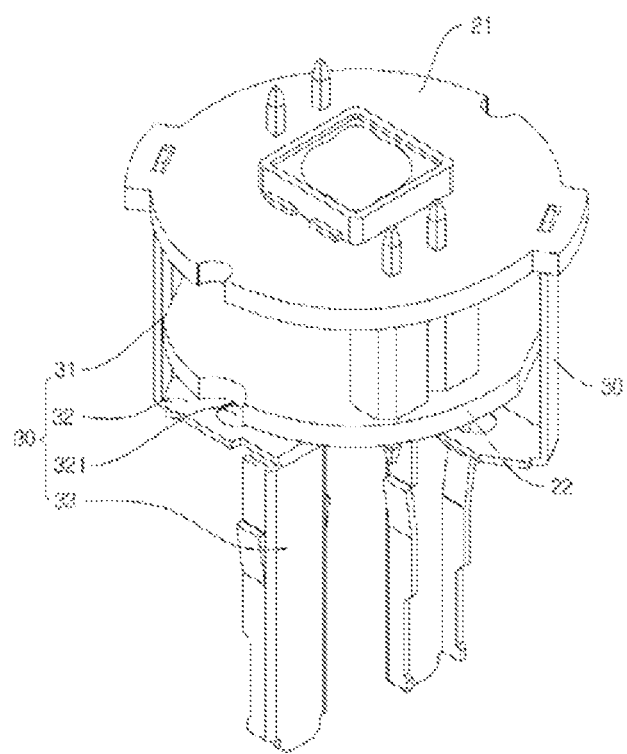
FIG. 7 is a perspective view showing a state of combining a substrate unit and contact terminals of a light emitting diode lamp assembly according to the present invention.

FIGS. 1 to 7 of drawings attached show an example of a specific implementation of a light emitting diode lamp assembly according to the present invention. FIG. 1 is a perspective view showing a light emitting diode lamp assembly according to the present invention. FIG. 2 is an exploded perspective view showing a light emitting diode lamp assembly according to the present invention. FIGS. 3 to 4 are perspective views showing a socket base of a light emitting diode lamp assembly according to the present invention. FIGS. 5A to 5B are perspective views showing a substrate unit of a light emitting diode lamp assembly according to the present invention. FIG. 6 is a perspective view showing a contact terminal of a light emitting diode lamp assembly according to the present invention. FIG. 7 is a perspective view showing a state of combining a substrate unit and contact terminals of a light emitting diode lamp assembly according to the present invention.

As shown in FIG. 2, a light emitting diode lamp assembly according to the present invention includes a housing unit 10 having a cross section formed in a Y shape. A contact terminal 30 is inserted inside the housing unit 10 and conducts electricity. A substrate unit 20 rests on the top of the housing unit 10 and receives power from the contact terminal 30. A cover unit 40 is positioned on the top of the substrate unit 20 and effectively radiates light emitted from an LED mounted on the substrate unit 20.

As shown in FIGS. 3 and 4, the housing unit 10 includes a body unit 11 having contact terminal guide grooves 111 formed on the front and rear surfaces. A substrate resting unit 12 rests on the top of the body unit 11 and has a cross section formed in a '⊏' shape.

The substrate resting unit 12 includes the grooves 121 formed on the top surface of the substrate resting unit 12 spaced apart from each other by a predetermined distance, and a substrate resting surface 122 formed inside the grooves.

A contact terminal guide through-hole 124 allows the contact terminal 30 described below to pass through so as to be inserted into a contact terminal guide groove 111 of the body unit 11. A latch protrusion unit 123 formed at one side of the contact terminal guide through-hole 124 and protruding toward the outside to settle the contact terminal are included inside the substrate resting unit 12. In addition, the substrate resting unit 12 includes a contact terminal fixing protrusion unit 125 formed between the latch protrusion unit 123 and the contact terminal guide through-hole 124 to fix the contact terminal 30. A plurality of air passage holes 126 are formed on the inner bottom surface of the substrate resting unit 12 to discharge heat to outside. A cover fixing unit 127 is positioned on the top of the substrate resting unit 12 to fix the cover unit 40.

The contact terminal fixing protrusion unit 125 may be engaged with and fixed to a contact terminal latch through-hole 321 of the contact terminal 30 described below.

The cover fixing unit 127 is positioned on the top of the substrate resting unit 12, and an insertion through-hole 1271 is formed inside thereof. The insertion through-hole 1271 has a predetermined depth so that a coupling protrusion unit 42 of the covering unit 40 can be inserted therein to fix the covering unit 40 to the housing unit 10.

As shown in FIGS. 5A and 5B, the substrate unit 20 rests on the substrate resting unit 12 of the housing unit 10. One or more surface-mounting type light emitting diodes 24 are mounted on the top surface of the substrate unit 20. A housing resting protrusion unit 211 including the contact terminal fixing holes 213 spaced apart from each other by a predetermined distance are formed inside the substrate, so that one end point of the contact terminal 30 fixed to the housing unit 10 may pass through the contact terminal fixing hole 213 and protrude upward.

In addition, a plurality of cover fixing unit coupling holes 214 is formed between the housing resting protrusion unit 211 and another housing resting protrusion unit 211 so that the cover fixing unit 127 of the covering unit 40 may be exposed to outside.

A general light emitting diode can be used as the light emitting diode 21, and since it is not a core technique of the present invention, detailed descriptions thereof will be omitted.

In addition, the substrate unit 20 includes a first substrate 21 formed in the horizontal direction, a second substrate 22 formed under the first substrate 21, and a conductive unit 23 for applying power supplied to the first substrate 21 to the second substrate 22.

In accordance with the present invention, the first substrate 21 and the second substrate 22 are spaced apart from each other by a predetermined distance as shown in FIG. 5A or the first substrate 21 is positioned perpendicular to the second substrate 22 as shown in FIG. 5B.

The conductive unit 23 includes a connection pin 231 inserted into the first substrate 21 and the second substrate 22, and fixed by soldering. An insulator 232 is positioned around the connection pin 231 and coated with an insulation material so that the incoming power from the contact terminal 30 flows into the second substrate 22 through the first substrate 21.

In addition, the substrate unit 20 may increase heat dissipation effect by forming the two substrates to be perpendicular to each other. The heat dissipation effect may be obtained separately by installing components on the first substrate 21 and the second substrate 22.

The contact terminal 30 is inserted into the contact terminal guide groove 111 through the contact terminal guide through-hole 124 of the housing 10. The contact terminal 30 includes, as shown in FIG. 6, a contact terminal body unit 31 coupled to the latch protrusion unit 123. A contact terminal extended protrusion unit 32 is formed in a "∟" shape by extending one end of the contact terminal body unit 31 toward the outside. The contact terminal extended protrusion unit 32 includes the contact terminal latch through-hole 321 to be engaged with and fixed to the contact terminal fixing protrusion unit 125, and a contact terminal fixing unit 33 extended to the other end of the contact terminal extended protrusion unit 32. The contact terminal fixing unit 33 is bent downward in a "⊓" shape and inserted into the contact terminal guide groove 111 of the body unit.

The contact terminal body unit 31 is extended toward outside from one upper end of the contact terminal extended protrusion unit 32 and inserted in the inner side of the latch protrusion unit 123. This allows an end point of the contact terminal body unit 31 to be inserted into the contact terminal fixing hole 213 of the substrate 20.

The contact terminal fixing unit 33 includes an extended protrusion 331 formed at the lower end portion of the contact terminal fixing unit 33 to be extended toward outside from both sides. This allows the extended protrusion 331 to be inserted as far as the bottom surface of the contact terminal guide groove 111. A contact terminal body extension piece 332 is formed between the extended protrusions 331 to be inclined toward the inside. The contact terminal body extension piece 332 is formed to be inclined toward the inside to be slidingly insertable without being latched when it is combined with a contact terminal binding piece (not shown) formed inside the socket (not shown) at a later time. In addition, a latch protrusion 333 is formed at one side of the extended protrusion 331. The latch protrusion 333 is latched to the bottom surface of the substrate resting unit 12 to prevent the contact terminal 30 from moving upwardly higher than the latch protrusion 333 when the contact terminal 30 is pulled from the bottom toward the top.

The cover unit 40 rests on top of the housing unit 10 and includes a plurality of grooves 41 formed at the lower portion to expose the housing resting protrusion unit 211 of the substrate unit 20 to outside. A coupling protrusion unit 42 is formed inside the cover unit 40 to be coupled to the cover fixing unit 127 of the housing unit 10. When the coupling protrusion unit 42 is combined with the cover fixing unit 127 of the housing unit 10, the coupling protrusion unit 42 is inserted into the cover fixing unit 127 by applying an adhesive or ultrasonic waves on the bottom surface of the coupling protrusion unit 42.

The present invention is effective in that lifespan of a lamp is extended since a light emitting diode is used rather than a filament light bulb. The inconvenience of frequently replacing a conventional filament light bulb when the filament is open circuited due to an external impact is solved since the light emitting diode is fixed on top of the substrate by soldering, and maintenance cost can be saved since a general socket is used.

Since the embodiments described in this specification and the configurations shown in the figures are merely preferred embodiments of the present invention and do not represent all the technical spirits of the present invention, it should be understood that there may be various equivalents and modifications capable of replacing them at the point of the application.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

Productivity and maintainability are improved by reducing work time when a work or a maintenance task is performed, and profitability is improved by simplifying the shape of components and facilitating assembly of the components.

The invention claimed is:

1. A light emitting diode (LED) lamp assembly, comprising:
  a housing unit having a Y-shaped cross-sectional area and comprising:
    a body unit comprising contact terminal guide grooves formed on front and rear surfaces;
    a substrate resting unit configured to rest on a top of the body unit and having a ⊏ shaped cross-sectional area, and the substrate resting unit comprises:
      grooves formed on a top surface of the substrate resting unit spaced apart from each other by a predetermined distance;
      a substrate resting surface formed inside the grooves;
      a latch protrusion unit formed at one side of the substrate resting surface and protruding outwardly to engage the contact terminal;
      a contact terminal guide through-hole for the contact terminal to pass through to be inserted into a contact terminal guide groove of the body unit;
      a contact terminal fixing protrusion unit formed between the latch protrusion unit and the contact terminal guide through-hole to engage and fix the contact terminal;
      a plurality of air passage holes formed on an inner bottom surface of the substrate resting unit to discharge heat to outside; and
      a cover fixing unit positioned on a top of the substrate resting unit to engage and fix the cover unit;
  a contact terminal configured to be inserted inside the housing unit and for conducting electricity;
  a substrate unit configured to rest on a top of the housing unit and for receiving power from the contact terminal; and
  a cover unit positioned on a top of the substrate unit and for effectively radiating light emitted from an LED mounted on the substrate unit.

2. A light emitting diode (LED) lamp assembly, comprising:
  a housing unit having a Y-shaped cross-sectional area;
  a contact terminal configured to be inserted inside the housing unit and for conducting electricity;
  a substrate unit configured to rest on a top of the housing unit and for receiving power from the contact terminal;
  a cover unit positioned on a top of the substrate unit and for effectively radiating light emitted from an LED mounted on the substrate unit;
  wherein the substrate unit is configured to rest on the substrate resting unit of the housing unit; wherein one or more surface-mounting type light emitting diodes are mounted on a top surface of the substrate unit; and
  wherein the substrate unit further comprises:
    a housing resting protrusion unit comprising contact terminal fixing holes spaced apart from each other by a predetermined distance inside the substrate; and
    a cover fixing unit coupling hole formed between the housing resting protrusion unit and another housing resting protrusion unit to expose the cover fixing unit of the covering unit to outside.

3. A light emitting diode (LED) lamp assembly, comprising:
  a housing unit having a Y-shaped cross-sectional area;
  a contact terminal configured to be inserted inside the housing unit and for conducting electricity;
  a substrate unit configured to rest on a top of the housing unit and for receiving power from the contact terminal;
  a cover unit positioned on a top of the substrate unit and for effectively radiating light emitted from an LED mounted on the substrate unit;
  wherein the substrate unit further comprises:
    a first substrate formed in a horizontal direction;
    a second substrate formed under the first substrate;
    a conductive unit for applying power supplied to the first substrate to the second substrate;
  wherein the conductive unit comprises:
    a connection pin configured to be inserted into the first substrate and the second substrate and fixed by soldering; and
    an insulator positioned around the connection pin and coated with an insulation material.

4. The lamp assembly according to claim 1, wherein the contact terminal is configured to be inserted into the contact terminal guide groove through the contact terminal guide through-hole of the housing unit and further comprises:
  a contact terminal body unit coupled to the latch protrusion unit;
  a contact terminal extended protrusion unit formed in a ∟ shape by extending one end of the contact terminal body unit toward outside and comprising the contact terminal latch through-hole configured to engage and fix to the contact terminal fixing protrusion unit; and
  a contact terminal fixing unit extending to other end of the contact terminal extended protrusion unit, bent downward in a ⏋ shape and configured to be inserted into the contact terminal guide groove of the body unit.

5. The lamp assembly according to claim 1, wherein the cover unit rests on a top of the housing unit and further comprises:
  a plurality of grooves formed at a lower portion of the cover unit to expose the housing resting protrusion unit of the substrate unit; and
  a coupling protrusion unit formed inside the cover unit to be coupled to the cover fixing unit of the housing unit.

6. The lamp assembly according to claim 2, wherein the cover unit rests on a top of the housing unit and further comprises:
- a plurality of grooves formed at a lower portion of the cover unit to expose the housing resting protrusion unit of the substrate unit; and
- a coupling protrusion unit formed inside the cover unit to be coupled to the cover fixing unit of the housing unit.

7. The lamp assembly according to claim 3, wherein the cover unit rests on a top of the housing unit and further comprises:
- a plurality of grooves formed at a lower portion of the cover unit to expose the housing resting protrusion unit of the substrate unit; and
- a coupling protrusion unit formed inside the cover unit to be coupled to the cover fixing unit of the housing unit.

* * * * *